United States Patent
Kim (10) Patent No.: US 9,976,622 B2
(45) Date of Patent: May 22, 2018

(54) DAMPING FORCE CONTROLLING SHOCK ABSORBER

(71) Applicant: MANDO CORPORATION, Pyeongtaek-si, Gyeonggi-do (KR)

(72) Inventor: Eun Joong Kim, Yongin-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days. days.

(21) Appl. No.: 15/331,392

(22) Filed: Oct. 21, 2016

(65) Prior Publication Data
US 2017/0114857 A1 Apr. 27, 2017

(30) Foreign Application Priority Data
Oct. 22, 2015 (KR) .................. 10-2015-0147494

(51) Int. Cl.
*F16F 9/348* (2006.01)
*F16F 9/19* (2006.01)
*F16F 9/44* (2006.01)

(52) U.S. Cl.
CPC .............. *F16F 9/348* (2013.01); *F16F 9/19* (2013.01); *F16F 9/44* (2013.01); *F16F 2228/066* (2013.01); *F16F 2232/08* (2013.01)

(58) Field of Classification Search
CPC ...... F16F 9/348; F16F 9/19; F16F 9/44; F16F 2228/066; F16F 2232/08
USPC ......... 188/313, 282.2, 282.6, 322.22, 322.15
See application file for complete search history.

(56) References Cited

U.S. PATENT DOCUMENTS

| | | | | | |
|---|---|---|---|---|---|
| 5,404,973 | A * | 4/1995 | Katoh | ..... | F16F 9/468 188/266.3 |
| 6,371,262 | B1 * | 4/2002 | Katou | ..... | F16F 9/465 188/266.5 |
| 6,474,454 | B2 * | 11/2002 | Matsumoto | ..... | F16F 9/3484 188/282.6 |
| 6,860,370 | B2 * | 3/2005 | Nakadate | ..... | F16F 9/3485 188/282.5 |
| 7,997,394 | B2 * | 8/2011 | Yamaguchi | ..... | F16F 9/465 188/266.2 |
| 8,651,252 | B2 * | 2/2014 | Katayama | ..... | F16F 9/3484 188/282.6 |
| 2012/0160620 | A1 * | 6/2012 | Yamashita | ..... | B60G 13/08 188/266.5 |
| 2015/0323037 | A1 * | 11/2015 | De Kock | ..... | F16F 9/46 188/313 |
| 2015/0362038 | A1 * | 12/2015 | Kim | ..... | F16F 9/3488 188/280 |
| 2016/0223047 | A1 * | 8/2016 | Kim | ..... | F16F 9/5165 |
| 2016/0333959 | A1 * | 11/2016 | Kim | ..... | F16F 9/5126 |
| 2017/0082169 | A1 * | 3/2017 | Kim | ..... | F16F 9/19 |

FOREIGN PATENT DOCUMENTS

KR 10-2009-0003019 A 1/2009

* cited by examiner

*Primary Examiner* — Thomas J Williams
*Assistant Examiner* — Mariano Sy
(74) *Attorney, Agent, or Firm* — McDermott Will & Emery LLP (57) ABSTRACT

In a damping force controlling shock absorber, a pilot passage and a bypass passage are shared between a cut-out portion formed in a hollow of a pilot disk and a branch groove of a spool guide, thus simplifying a passage structure, simplifying a passage adjustment structure of a spool, and improving productivity and dispersion of products.

8 Claims, 6 Drawing Sheets

DAMPING FORCE CONTROLLING SHOCK ABSORBER

CROSS-REFERENCE(S) TO RELATED APPLICATION

This application claims the benefit of Korean Patent Application No. 10-2015-0147494, filed on Oct. 22, 2015, in the Korean Intellectual Property Office, the disclosure of which is incorporated herein in its entirety by reference.

BACKGROUND OF THE INVENTION

Field of the Invention

The present invention relates to a damping force controlling shock absorber, and more particularly, to a damping force controlling shock absorber, in which a pilot passage and a bypass passage are shared between a cut-out portion formed in a hollow of a pilot disk and a branch groove of a spool guide, thereby simplifying a passage structure, simplifying a passage adjustment structure of a spool, and improving productivity and dispersion of products.

Description of the Related Art

In general, a shock absorber is installed in means of transportation, such as automobile or the like, and improves ride comfort by absorbing and damping a vibration or shock transferred from a road surface during driving.

Such a shock absorber includes a cylinder and a piston rod installed to be compressible and extendable within the cylinder. The cylinder and the piston rod are coupled to a vehicle body, wheels, or axles.

A shock absorber, a damping force of which is set to be low, can improve ride comfort by absorbing a vibration caused by unevenness of a road surface during driving. On the contrary, a shock absorber, a damping force of which is set to be high, can improve steering stability by suppressing a change in a posture of a vehicle body.

Therefore, there has been developed a damping force controlling shock absorber in which a damping force controlling valve capable of appropriately adjusting damping force characteristics is mounted on one side thereof, such that the damping force characteristics are appropriately adjusted to improve ride comfort or steering stability according to a road surface and a driving condition.

In general, such a conventional damping force controlling shock absorber has a structure to select a hard passage and a soft passage by selectively opening and closing a plurality of passages formed in a spool guide while changing a position of a spool.

That is, a hard damping force or a soft damping force may be selectively generated by selectively adjusting an opened/closed state of the hard passage and the soft passage formed in the spool guide.

To this end, the conventional damping force controlling shock absorber individually forms the pilot passage for forming the hard damping force and the soft passage for forming the soft damping force.

However, in the conventional damping force controlling shock absorber, since the hard passage and the soft passage are individually formed, the structure of the apparatus becomes complicated and dispersion may occur during mass production. Due to the complicated structure, the assembling of the apparatus is difficult, resulting in an increase in manufacturing costs.

As the prior art document related to the present invention, Korean Patent Application Laid-Open No. 10-2009-0003019 (Jan. 9, 2009) discloses a damping force controlling shock absorber.

SUMMARY OF THE INVENTION

An aspect of the present invention is to provide a damping force controlling shock absorber, in which a pilot passage and a bypass passage are shared between a cut-out portion formed in a hollow of a pilot disk and a branch groove of a spool guide, thereby simplifying a passage structure, simplifying a passage adjustment structure of a spool, and improving productivity and dispersion of products.

Another aspect of the present invention is to provide a damping force controlling shock absorber, in which a pilot passage is formed in an outer peripheral surface of a spool guide so as to be easily applied to a product, and a pilot chamber and a bypass passage are configured in parallel such that a fluid of the pilot chamber is easily discharged, whereby a high-speed damping force can be stably maintained in a soft mode.

Another aspect of the present invention is to provide a damping force controlling shock absorber, in which a passage is formed in a coupling portion of a pilot disk and a spool guide, without forming a passage on a surface of a pilot disk, thereby improving durability of a valve and assemblability through a simplified assembly structure.

According to an embodiment of the present invention, there is provided a damping force controlling shock absorber, which includes a piston dividing a cylinder into a compression chamber and a rebound chamber in a state of being connected to a piston rod performing compression and rebound strokes within the cylinder, the piston having a main passage penetrating therethrough, and a solenoid installed in the piston rod to move a spool, the damping force controlling shock absorber including: retainers respectively disposed on top and bottom surfaces of the piston, wherein a connection passage is formed therein; housings respectively disposed on opposite surfaces of the retainers to form pilot chambers on one surface adjacent to the retainers, wherein a pilot passage is formed such that the pilot chambers communicate with the outside; pilot valves disposed between the retainers and the housings to form a main passage such that the pilot valves open the connection passage during a stroke to move a fluid to the pilot chambers, and the fluid passing through the connection passage is moved to the compression chamber or the rebound chamber; a check valve that blocks the pilot passage on opposite surfaces of the housings and opens the pilot chamber during a stroke to form a pilot passage such that a fluid of the pilot chamber is moved to the compression chamber or the rebound chamber; and a spool guide that penetrates and connects to the retainers, the housings, and the pilot valve to form a bypass passage, wherein a branch groove is concavely formed on an outer peripheral surface of the spool guide so as to branch to the pilot chamber or a guide hole thereinside when the stroke is performed in a hard mode or a soft mode.

The pilot valve may include: one or more first pilot disks that are arranged in a state of contacting the opposite surfaces of the retainers, wherein a first cut-out portion is formed along an inner peripheral surface of a first hollow where the spool guide penetrates and connects such that the fluid is moved to the pilot chamber; one or more second pilot disks that support the opposite surfaces of the pilot disks, wherein a second cut-out portion is formed along an inner peripheral surface of a second hollow where the spool guide penetrates and connects such that the fluid is moved to the pilot chamber; and one or more third pilot disks that support the opposite surfaces of the first pilot disks, wherein a third hollow is formed such that the spool guide penetrates and connects thereto in a state of being spaced, a third cut-out portion is formed along an inner peripheral surface of the third hollow, and a side surface thereof is installed to be movable in a state of tightly contacting an inner wall of the pilot chamber.

The inner peripheral surfaces of the first hollow and the second hollow may locally tightly contact the outer peripheral surface of the spool guide, and the first cut-out portion and the second cut-out portion may be concavely formed in a direction opposite to the spool guide and are spaced apart from the outer peripheral surface of the spool guide.

The first cut-out portion and the second cut-out portion may be formed to have a wave shape along the inner peripheral surfaces of the first hollow and the second hollow.

The first cut-out portion and the second cut-out portion may be disposed between an upper end and a lower end of the branch groove.

The branch groove may be formed corresponding to both sides of the spool guide in a longitudinal direction.

First tapered portions, whose diameter gradually increases in an upward direction, may be formed in an upper portion of the branch groove, wherein the inner peripheral surfaces of the retainers are coupled to the first tapered portions in a corresponding shape, and second tapered portions, whose diameter gradually decreases in a downward direction, may be formed in a lower portion of the branch groove, wherein the inner peripheral surfaces of the housings are coupled to the second tapered portions in a corresponding shape.

On the outer peripheral surface of the spool guide, a first passage may be formed toward the compression chamber with respect to the piston to connect the guide hole and the compression chamber and is opened when the spool is moved to an opening position, a second passage may be formed at a position of the branch groove toward the compression chamber with respect to the first passage to connect the guide hole and the connection passage and is opened when the spool is moved to the opening position, a third passage may be formed toward the rebound chamber with respect to the piston to connect the guide hole and the rebound chamber and is opened when the spool is moved to an opening position, and a fourth passage may be formed at the position of the branch groove toward the rebound chamber with respect to the third passage to connect the guide hole and the connection passage and is opened when the spool is moved to the opening position.

After the fluid is moved along the main passage and the connection passage during the stroke, the main passage may be formed toward the compression or the rebound chamber by the opening of the pilot valve; after the fluid is moved along the main passage and the connection passage during the stroke, the pilot passage may be formed toward the compression or the rebound chamber by the opening of the pilot valve; and after the fluid is moved along the main passage and the connection passage during the stroke, the bypass passage may be formed toward the compression or the rebound chamber by the opening of the pilot valve.

DETAILED DESCRIPTION OF EMBODIMENTS

Hereinafter, preferred embodiments of the present invention will be described in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be embodied in various forms. These embodiments are provided so that this disclosure will be thorough and complete, and will fully convey the scope of the invention to those skilled in the art. The scope of the present invention is defined by the appended claims.

In addition, detailed descriptions of well-known technologies or the like will be omitted since they would unnecessarily obscure the subject matters of the present invention.

Figure 1:
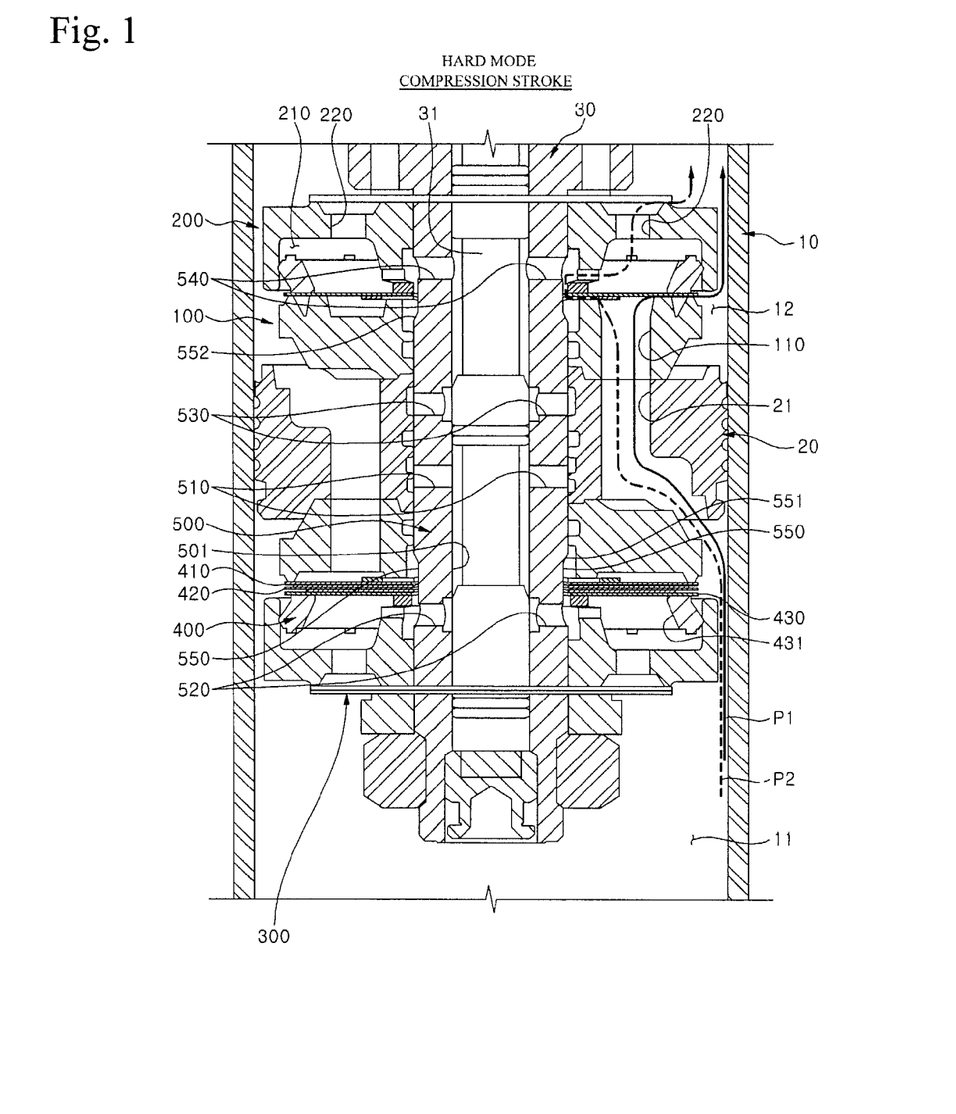
FIG. 1 is a front cross-sectional view illustrating a compression stroke state in a hard mode of a damping force controlling shock absorber according to the present invention.
Figure 2:
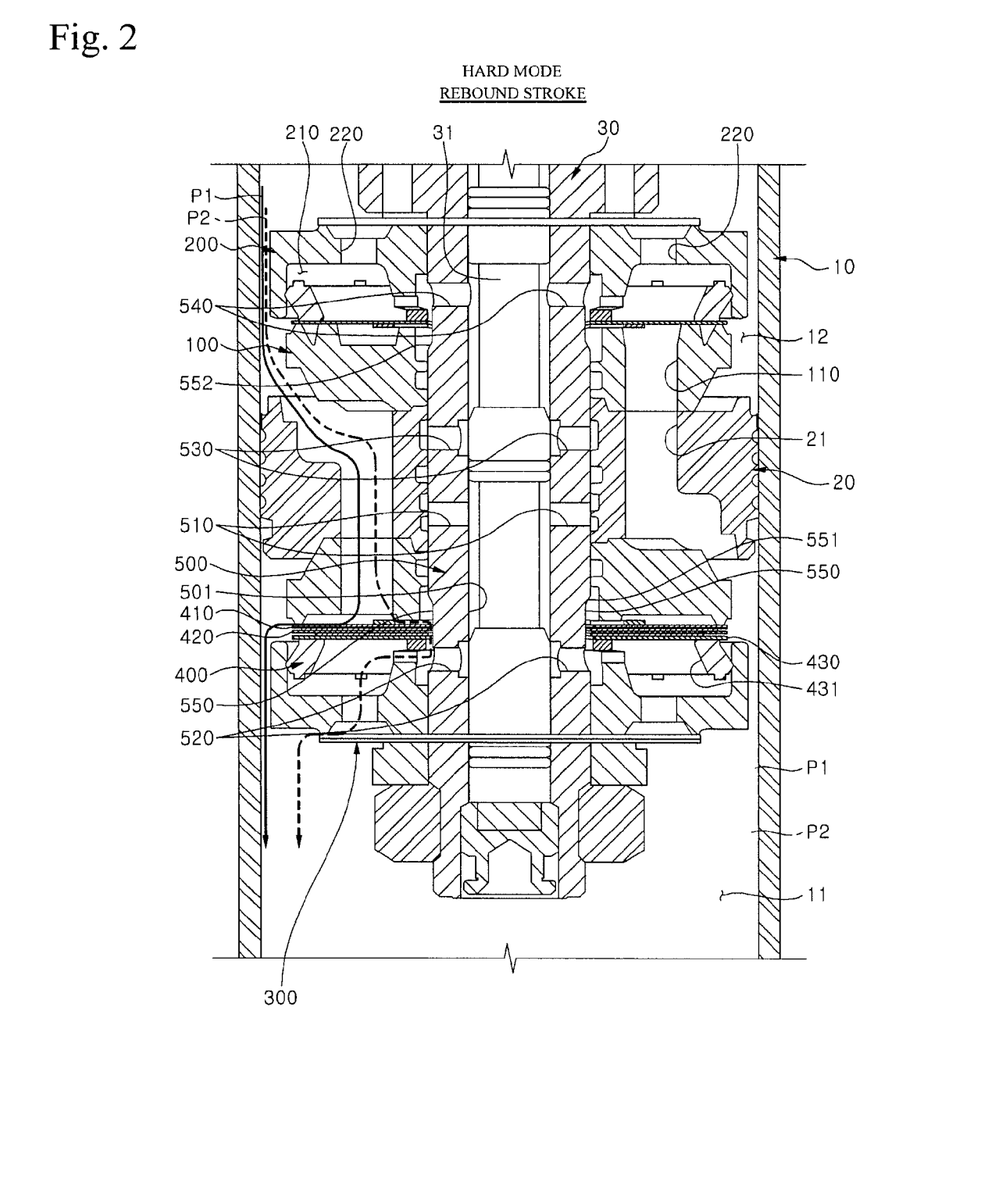
FIG. 2 is a front cross-sectional view illustrating a rebound stroke state in the hard mode of the damping force controlling shock absorber according to the present invention.

FIG. 1 is a front cross-sectional view illustrating a compression stroke state in a hard mode of a damping force controlling shock absorber according to the present invention, and FIG. 2 is a front cross-sectional view illustrating a rebound stroke state in a hard mode of a damping force controlling shock absorber according to the present invention.

Figure 3:
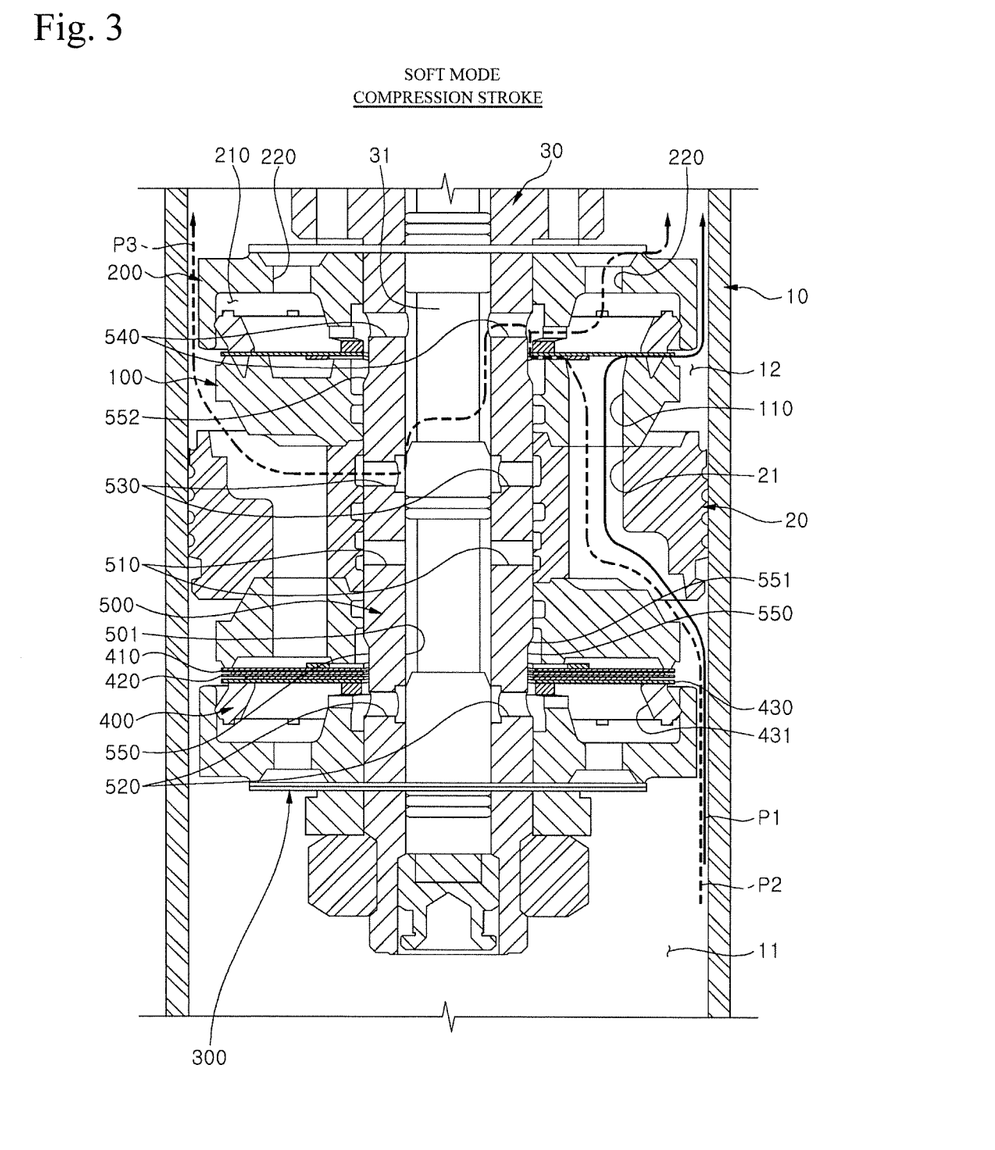
FIG. 3 is a front cross-sectional view illustrating a compression stroke state in a soft mode of the damping force controlling shock absorber according to the present invention.
Figure 4:
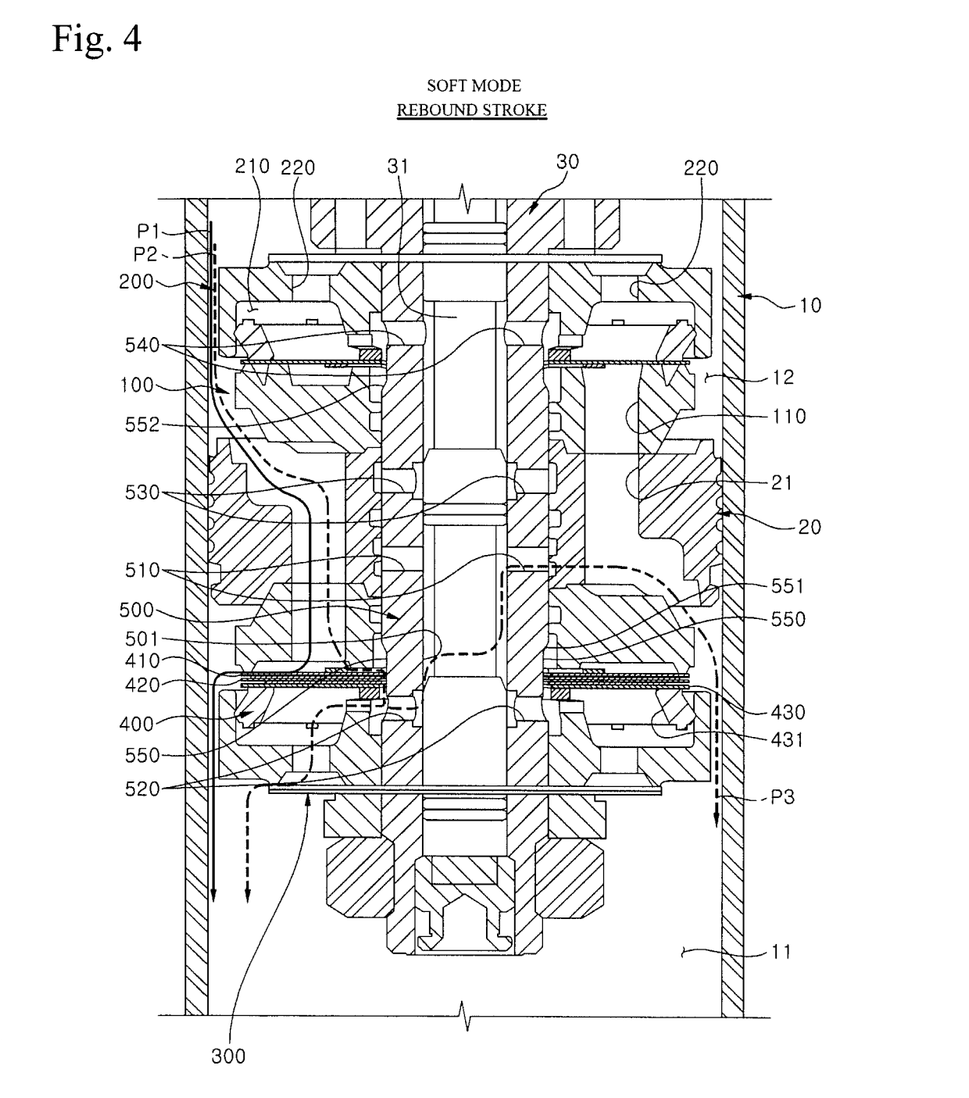
FIG. 4 is a front cross-sectional view illustrating a rebound stroke state in the soft mode of the damping force controlling shock absorber according to the present invention.

FIG. 3 is a front cross-sectional view illustrating a compression stroke state in a soft mode of the damping force controlling shock absorber according to the present invention, and FIG. 4 is a front cross-sectional view illustrating a rebound stroke state in the soft mode of the damping force controlling shock absorber according to the present invention.

Figure 5:
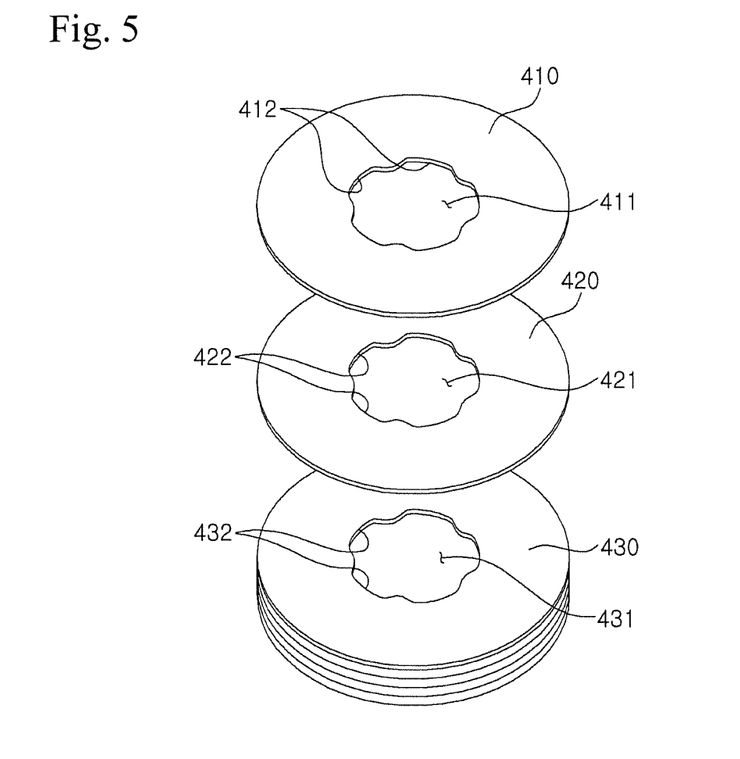
FIG. 5 is a perspective view illustrating a first pilot disk, a second pilot disk, and a third pilot disk of the damping force controlling shock absorber according to the present invention.
Figure 6:
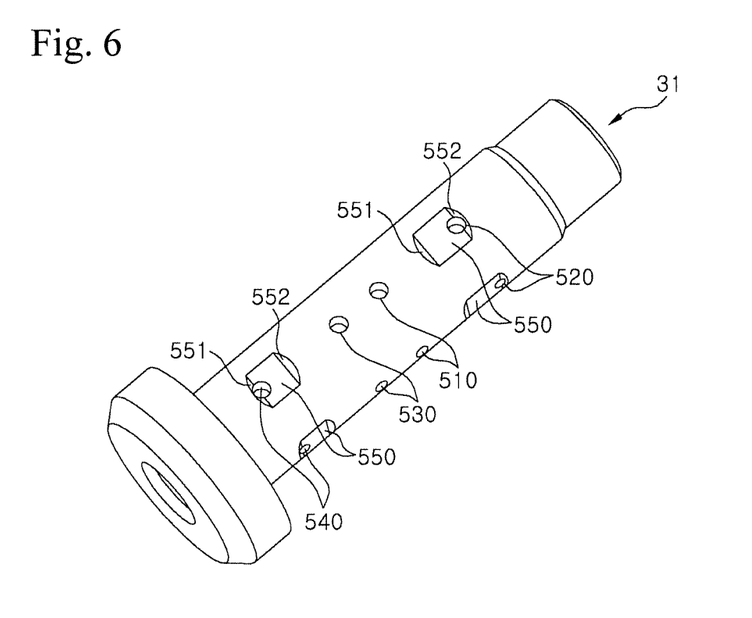
FIG. 6 is an exploded perspective view illustrating a spool guide of the damping force controlling shock absorber according to the present invention.

FIG. 5 is a perspective view illustrating a first pilot disk, a second pilot disk, and a third pilot disk of the damping force controlling shock absorber according to the present invention, and FIG. 6 is an exploded perspective view illustrating a spool guide of the damping force controlling shock absorber according to the present invention.

Referring to FIGS. 1 to 6, the damping force controlling shock absorber according to the present invention includes a cylinder 10, a piston rod (not illustrated), a piston 20, and a solenoid 30.

In particular, the damping force controlling shock absorber includes a pair of retainers 100, a pair of housings 200, a pair of pilot valves 400, a check valve 300, and a spool guide 500.

The cylinder 10 is made to have a cylindrical shape to form an inner space, and the cylinder 10 is filled with a working fluid (oil, etc.).

A separate connection portion (not illustrated) for connection to a vehicle body side or a wheel side may be installed in a lower end of the cylinder 10.

One end of the cylinder 10 and one end of the piston rod may perform compression and rebound strokes in a state of being respectively connected to the vehicle body side or the wheel side of the vehicle.

One end of the piston rod (not illustrated) is connected to the piston 20, and the other end of the piston rod extends outward from the cylinder 10 and is connected to the vehicle body side or the wheel side of the vehicle.

The piston 20 divides the inside of the cylinder 10 into a compression chamber 11 and a rebound chamber 12, which are respectively an upper portion and a lower portion of the cylinder 10. A main passage 21 passes through the piston 20 in a vertical direction.

The main passage 21 is divided into a compression passage for moving a fluid of the compression chamber 11 to the rebound chamber 12 during the compression stroke, and a rebound passage for moving a fluid of the rebound chamber 12 to the compression chamber 11 during the rebound stroke.

A solenoid valve 30 is connected to the piston rod disposed inside the cylinder 10 and selectively opens and closes a hard passage by elevating a spool 31 during driving.

To this end, the solenoid valve 30 may include an operating chamber in which the spool 31 is elevatably installed, and a coil wound around the outside of the operating chamber.

The pair of retainers 100 are respectively connected to top and bottom surfaces of the piston 20, a connection passage 110 connected to the main passage 21 passes through the retainers 100 in a vertical direction.

The main passage 21 is divided into a compression passage for moving a fluid of the compression chamber 11 to the rebound chamber 12 during the compression stroke, and a rebound passage for moving a fluid of the rebound chamber 12 to the compression chamber 11 during the rebound stroke.

The pair of housings 200 are respectively disposed on opposite surfaces of the retainers 100, and a pilot chamber 210 is formed on one surface adjacent to the retainers 100.

A pilot passage 220 passes through the housings 200 in a vertical direction such that the pilot chamber 210 communicates with the compression chamber 11 or the rebound chamber 12.

The pilot chamber 210 is opened toward the retainer 100, and a rubber 430 to be described below is installed to be vertically movable thereinside.

The pilot passage 220 passes through the housings 200 in a vertical direction so as to move a fluid of the pilot chamber 210 to the compression chamber 11 or the rebound chamber 12.

Check valves 300 are respectively disposed on opposite surfaces of the housings 200 so as to block the pilot passage 220. The check valves 300 are opened during the compression and rebound strokes to form a pilot passage for the compression chamber 11 or the rebound chamber 12 together with the pilot passage 220.

For example, as illustrated in FIGS. 1 and 2, the check valves 300 are opened in the hard mode by a force transferred from the pilot chamber 210, and thus, the fluid passing through the pilot passage 210 and the pilot passage 220 can be discharged to the compression chamber 11 or the rebound chamber 12.

The check valves 300 may be installed in a state in which a spool guide 500 to be described below passes therethrough, and the check valves 300 may be provided with a plurality of disks connected together.

The pilot valves 400 may be disposed between the retainers 100 and the housings 200, may open the connection passage 110 during the stroke to move the fluid to the pilot chamber 210, and may form the main passage P1 so that the fluid passing through the connection passage 110 is moved to the compression chamber 11 or the rebound chamber 12.

After the fluid is moved along the main passage 21 and the connection passage 110 during the compression and rebound strokes, the main passage P1 is formed toward the compression chamber 11 or the rebound chamber 12 by the opening of the pilot valve 400.

To this end, the pilot valve 400 may be provided with one or more first pilot disks 410, one or more second pilot disks 420, and one or more third pilot disks 430.

The first pilot disks 410 are installed in a state of contacting opposite surfaces of the retainers 100.

The first pilot disk 410 may have a disk shape with a first hollow 410 at the center thereof, such that the spool guide 500 to be described below passes through and connects to the center of the first pilot disk 410.

One or more first cut-out portions 412 are concavely formed in the inner peripheral surface of the first hollow 411 such that the fluid is moved to the pilot chamber 210.

Also, the inner peripheral surface of the first hollow 411 may be locally disposed to tightly contact the outer peripheral surface of the spool guide 500 to be described below.

The first cut-out portion 412 is concavely formed to have a wave shape along the inner peripheral surface of the first hollow 411 and is disposed spaced apart from the outer peripheral surface of the spool guide 500.

The second pilot disks 420 are installed in a state of contacting opposite surfaces of the first pilot disks 410.

The second pilot disk 420 may have a disk shape with a second hollow 421 at the center thereof, such that the spool guide 500 to be described below passes through and connects to the center of the second pilot disk 410.

One or more second cut-out portions 422 are concavely formed in the inner peripheral surface of the second hollow 421 such that the fluid is moved to the pilot chamber 210.

The second cut-out portion 422 and the first cut-out portion 412 form a pilot passage so that the hard damping force is formed together with a branch groove 550 to be described below, and also forms a bypass passage so that the fluid is discharged to a second passage 520 to be described below.

That is, since the second cut-out portion 422, the first cut-out portion 412, and the branch groove 550 to be described below share a partial section of the pilot passage and the bypass passage with one another, a passage structure can be simplified and a passage adjustment structure can be simplified, thereby improving productivity and dispersion of products.

Also, the inner peripheral surface of the second hollow 421 is locally disposed to tightly contact the outer peripheral surface of the spool guide 500 to be described, and the second cut-out portion 422 is concavely formed to have a wave shape along the inner peripheral surface of the second hollow 421 and is disposed spaced apart from the outer peripheral surface of the spool guide 500.

The third pilot disks 430 are installed in a state of contacting opposite surfaces of the second pilot disks 420.

The third pilot disk 430 may have a disk shape with a third hollow 431 at the center thereof, such that the spool guide 500 to be described below passes through and connects to the center of the third pilot disk 430.

Side surfaces of the third pilot disks 430 are movably installed while tightly contacting an inner wall of the pilot chamber 210 described above.

Also, a rubber with a hollow in a center is further provided under the third pilot disk 430, and the hollow of the rubber may be formed on the same central axis as the third hollow 431.

In this case, the side surface of the rubber may be installed to be movable while tightly contacting the inner wall of the pilot chamber 210.

In addition, one or more third cut-out portions 432 are formed along the inner periphery of the third hollow 431. The third cut-out portions 432 may be formed at the same positions as the first cut-out portions 412 and the second cut-out portions 422, and the number of the third cut-out portions 432 may be the same as the number of the first cut-out portions 412 and the second cut-out portions 422.

The third cut-out portion 432 is concavely formed to have a wave shape along the inner peripheral surface of the third hollow 431 and is disposed spaced apart from the outer peripheral surface of the spool guide 500.

As such, the third cut-out portion 432, the first cut-out portion 412, and the second cut-out portion 422 contact one another to form one vertical passage and are disposed between the upper and lower ends of the branch groove 550 to form a passage to allow the movement of the fluid.

When the compression and rebound strokes are performed in the hard mode, the edge portion of the third pilot disk 430 is opened by a pressure of the fluid moving through the connection passage 110, and thus, the connection passage 110 communicates with the compression chamber 11 or the rebound chamber 12.

For example, when the compression and rebound strokes are performed as illustrated in FIGS. 1 and 2, the edge portion of the third pilot disk 430 may be bent downward and opened by the pressure of the fluid moving through the connection passage 110.

At this time, a main passage P1 is formed to allow the fluid to move to the compression chamber 11 or the rebound chamber 12 through the connection passage 110.

After that, a pressure above a set pressure range is formed within the pilot chamber 210. In this process, the check valve 300 is opened to form a pilot passage P2 communicating the pilot passage 220 with the compression chamber 11 or the rebound chamber 12.

After the fluid is moved along the main passage 21 and the connection passage 110 during the compression and rebound strokes, the pilot passage P2 is formed toward the compression chamber 11 or the rebound chamber 12 by the opening of the pilot valve 400.

The spool guide 500 may penetrate and connect to the housings 200 through the retainers 100 and the pilot valves 400 and may have a guide hole 501 having a length in a vertical direction.

A spool 31 is installed in the guide hole 501 so as to be movable upward and downward, and the guide hole 501 may be opened or closed according to an opening/closing position of the spool 31.

For example, when the stroke is performed in a state in which the spool 31 disposed within the guide hole 501 of the spool guide 500 is moved to the opening position, a bypass passage P3 is formed so that the fluid branched before being introduced into the pilot chamber 210 to be described below is moved to the compression chamber 11 or the rebound chamber 12 through the guide hole 501.

In this way, when the guide hole 501 is opened, the mode can be switched to the soft mode as illustrated in FIGS. 3 and 4. In this case, the bypass passage P3 sharing a certain passage with the pilot passage P2 may be formed.

After the fluid is moved along the main passage 21 and the connection passage 110 during the compression and rebound strokes, the bypass passage P3 is formed toward the compression chamber 11 or the rebound chamber 12 by the opening of the pilot valve 400.

To this end, a first passage 510, a second passage 520, a third passage 530, and a fourth passage 540 may be horizontally penetrated on the outer peripheral surface of the spool guide 500.

The first passage 510 is formed toward the compression chamber 11 with respect to the piston 20 to connect the guide hole 501 and the compression chamber 11, and is opened when the spool 31 is moved to the opening position.

The second passage 520 is formed toward the compression chamber 11 with respect to the first passage 510, and the second passage 520 may be horizontally penetrated at the position of the branch groove 550 to be described below.

As such, when the compression and rebound strokes are performed in a state in which the spool 31 is moved to the opening position, the second passage 520 connects the guide hole 501 and the connection passage 110.

The third passage 530 is horizontally penetrated toward the rebound chamber 12 with respect to the piston 20 to connect the guide hole 501 and the rebound chamber 12, and is opened when the spool 31 is moved to the opening position.

The fourth passage 540 is formed toward the rebound chamber 12 with respect to the third passage 530, and the fourth passage 540 may be horizontally penetrated at the position of the branch groove 550 to be described below.

In particular, the branch groove 550 is concavely formed on the outer peripheral surface of the spool guide 500 so as to branch to the pilot chamber 210 or the guide hole 501 thereinside when the stroke is performed in the hard mode or the soft mode.

The branch groove 550 may be formed at each of both sides of the spool guide 500 in a longitudinal direction, and a plurality of branch grooves 550 may be formed in a transverse direction of the spool guide 500.

First tapered portions 551, whose diameter gradually increases in an upward direction, may be formed in an upper portion of the branch groove 550.

In this case, the inner peripheral surfaces of the retainers 100 may be coupled to the first tapered portions 551 in the corresponding shape.

In addition, second tapered portions 552, whose diameter gradually decreases in a downward direction, may be formed in a lower portion of the branch groove 550.

In this case, the inner peripheral surfaces of the housings 200 may be coupled to the second tapered portions 552 in the corresponding shape.

As such, the first cut-out portion 412 and the second cut-out portion 422 are disposed between the upper and lower ends of the branch groove 550 to form the passage to allow the movement of the fluid.

Hereinafter, the operation of the damping force controlling shock absorber according to the present invention will be described with reference to FIGS. 1 to 4.

First, when the compression and rebound strokes are performed in a state in which the spool 31 is positioned in the hard mode, the fluid of the compression chamber 11 or the rebound chamber 12 is introduced through the main passage 21 of the piston 20 as illustrated in FIGS. 1 and 2.

Then, the fluid introduced into the main passage 21 is discharged to the compression chamber 11 or the rebound chamber 12 through the connection passage 110. In this process, the first pilot disk 420 tightly contacted in a discharging direction of the connection passage 110 is opened to generate a main damping force (main passage P1).

Simultaneously, the fluid introduced into the main passage 21 flows into the pilot chamber 210 through the connection passage 110, the first hollow 411 of the first pilot disk 410, the second hollow 421 of the second pilot disk 420, and the third hollow 431 of the third pilot disk 430.

In this process, the fluid flows into the pilot chamber 210 through the first cut-out portion 412, the second cut-out portion 422, and the branch groove 550 of the spool guide 500.

That is, the flow rate of the fluid flowing into the pilot chamber 210 can be controlled by adjusting the size and the recessed degree of the first cut-out portion 412, the second cut-out portion 422, and the branch groove 550.

Then, the fluid flowing into the pilot chamber 210 is discharged to the compression chamber 11 or the rebound chamber 12 through the pilot passage 220. In this process, the auxiliary valve 230 tightly contacting the pilot passage 220 is opened to generate an additional damping force (pilot passage P2).

On the other hand, when the compression and rebound strokes are performed in a state in which the spool 31 is positioned in the soft mode, the fluid of the compression chamber 11 or the rebound chamber 12 is introduced through the main passage 21 of the piston 20 as illustrated in FIGS. 3 and 4.

Then, the fluid introduced into the main passage 21 is discharged to the compression chamber 11 or the rebound chamber 12 through the connection passage 110. In this process, the first pilot disk 420 tightly contacted in a discharging direction of the connection passage 110 is opened to generate a main damping force (main passage P1).

Simultaneously, the fluid introduced into the main passage 21 flows into the pilot chamber 210 through the connection passage 110, the first hollow 411 of the first pilot disk 410, the second hollow 421 of the second pilot disk 420, and the third hollow 431 of the third pilot disk 430.

In this process, the fluid flows into the pilot chamber 210 through the first cut-out portion 412, the second cut-out portion 422, and the branch groove 550 of the spool guide 500.

At this time, since the inner peripheral surfaces of the first pilot disk 410 and the second pilot disk 420 are partially deformed by the pressure of the fluid, the fluid may be moved to the pilot chamber 210.

That is, the flow rate of the fluid flowing into the pilot chamber 210 can be controlled by adjusting the size and the recessed degree of the first cut-out portion 412, the second cut-out portion 422, and the branch groove 550.

Then, the fluid flowing into the pilot chamber 210 is discharged to the compression chamber 11 or the rebound chamber 12 through the pilot passage 220. In this process, the auxiliary valve 230 tightly contacting the pilot passage 220 is opened to generate an additional damping force (pilot passage P2).

Simultaneously, the soft damping force (bypass passage P3) is formed while the fluid passing through the first cut-out portion 412, the second cut-out portion 422, and the branch groove 550 is discharged to the compression chamber 11 or the rebound chamber 12 through the second passage 520 formed at the position of the branch groove 550, the guide hole 501, and the first passage 510.

Consequently, the pilot passage P2 and the bypass passage P3 are shared between the first and second cut-out portions 412 and 422, which are formed within the first and second hollows 411 and 421 of the first and second pilot disks 410 and 420, and the branch groove 550 of the spool guide 500.

Therefore, it is possible to simplify the passage structure, simplify the passage adjustment structure of the spool 31, and improve productivity and dispersion of products.

Also, the pilot passage P2 is formed on the outer peripheral surface of the spool guide 500 so as to be easily applied to the product, and the pilot chamber 210 and the bypass passage can be configured in parallel such that the fluid of the pilot chamber 210 is easily discharged, whereby the high-speed damping force can be stably maintained in the soft mode.

Furthermore, the passage is formed in the coupling portion of the first and second pilot disks 410 and 420 and the spool guide 500, without forming the passage on the surface of the first and second pilot disks 410 and 420, thereby improving durability of the valve and assemblability through the simplified assembly structure.

Moreover, the cross-sectional area of the bypass passage can be increased by forming the wave-shaped first and second cut-out portions 412 and 422 within the first and second hollows of the first and second pilot disks 410 and 420, thereby increasing the degree of freedom of the low-speed damping force reduction in the soft mode The damping force controlling shock absorbers according to embodiments of the present invention have been described, but it is obvious that various modifications can be made thereto without departing from the scope of the present invention.

Therefore, the scope of the present invention should not be limited to the embodiments described above, and will be determined by the appended claims and equivalents thereof.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS | |
|---|---|
| 10: cylinder | 11: compression chamber |
| 12: rebound chamber | 20: piston |
| 21: main passage | 30: solenoid valve |
| 31: spool | 100: retainer |
| 110: connection passage | 200: housing |
| 210: pilot chamber | 220: pilot passage |
| 300: check valve | 400: pilot valve |
| 410: first pilot disk | 411: first hollow |
| 412: first cut-out portion | 420: second pilot disk |
| 421: first hollow | 422: second cut-out portion |
| 430: third pilot disk | 431: third hollow |
| 432: third cut-out portion | 500: spool guide |
| 501: guide hole | 510: first passage |
| 520: second passage | 530: third passage |
| 540: fourth passage | 550: branch groove |
| 551: first tapered portion | 552: second tapered portion |
| P1: main passage | P2: pilot passage |
| P3: bypass passage | |

What is claimed is:

1. A damping force controlling shock absorber, which includes a piston dividing a cylinder into a compression chamber and a rebound chamber in a state of being connected to a piston rod performing compression and rebound strokes within the cylinder, the piston having a main channel penetrating therethrough, and a solenoid installed in the piston rod to move a spool, the damping force controlling shock absorber comprising:

retainers respectively disposed on top and bottom surfaces of the piston, wherein a connection channel is formed therein;

housings respectively disposed on opposite surfaces of the retainers to form pilot chambers on one surface adjacent to the retainers, wherein a pilot channel is formed such that the pilot chambers communicate with the outside;

pilot valves disposed between the retainers and the housings to form a main passage such that the pilot valves open the connection channel during a stroke to move a fluid to the pilot chambers, and the fluid passing through the connection channel is moved to the compression chamber or the rebound chamber;

a check valve that blocks the pilot channel on opposite surfaces of the housings and opens the pilot chamber during a stroke to form a pilot passage such that a fluid of the pilot chamber is moved to the compression chamber or the rebound chamber; and a spool guide that penetrates and connects to the retainers, the housings, and the pilot valve to form a bypass passage, wherein a branch groove is concavely formed on an outer peripheral surface of the spool guide so as to branch to the pilot chamber or a guide hole thereinside when the stroke is performed in a hard mode or a soft mode, wherein the branch groove includes:
first tapered portions, whose diameter gradually increases in an upward direction, in an upper portion of the branch groove, so that the inner peripheral surfaces of the retainers are coupled to the first tapered portions in a corresponding shape; and
second tapered portions, whose diameter gradually decreases in a downward direction, in a lower portion of the branch groove, so that the inner peripheral surfaces of the housings are coupled to the second tapered portions in a corresponding shape, wherein the spool guide includes:
a first passage formed on the outer peripheral surface thereof; and
a second passage formed on each of the second tapered portions.

2. The damping force controlling shock absorber according to claim 1, wherein the pilot valve comprises:
one or more first pilot disks that are arranged in a state of contacting the opposite surfaces of the retainers, wherein a first cut-out portion is formed along an inner peripheral surface of a first hollow where the spool guide penetrates and connects such that the fluid is moved to the pilot chamber;
one or more second pilot disks that support the opposite surfaces of the pilot disks, wherein a second cut-out portion is formed along an inner peripheral surface of a second hollow where the spool guide penetrates and connects such that the fluid is moved to the pilot chamber; and
one or more third pilot disks that support the opposite surfaces of the first pilot disks, wherein a third hollow is formed such that the spool guide penetrates and connects thereto in a state of being spaced, a third cut-out portion is formed along an inner peripheral surface of the third hollow, and a side surface thereof is installed to be movable in a state of tightly contacting an inner wall of the pilot chamber.

3. The damping force controlling shock absorber according to claim 2, wherein
the inner peripheral surfaces of the first hollow and the second hollow locally tightly contact the outer peripheral surface of the spool guide, and
the first cut-out portion and the second cut-out portion are concavely formed in a direction opposite to the spool guide and are spaced apart from the outer peripheral surface of the spool guide.

4. The damping force controlling shock absorber according to claim 3, wherein the first cut-out portion and the second cut-out portion are formed to have a wave shape along the inner peripheral surfaces of the first hollow and the second hollow.

5. The damping force controlling shock absorber according to claim 3, wherein the first cut-out portion and the second cut-out portion are disposed between an upper end and a lower end of the branch groove.

6. The damping force controlling shock absorber according to claim 1, wherein the branch groove is formed corresponding to both sides of the spool guide in a longitudinal direction.

7. The damping force controlling shock absorber according to claim 1, wherein
the first passage is formed toward the compression chamber with respect to the piston to connect the guide hole and the compression chamber and is opened when the spool is moved to an opening position,
the second passage is formed at a position of the branch groove toward the compression chamber with respect to the first passage to connect the guide hole and the connection channel and is opened when the spool is moved to the opening position,
a third passage, which is formed on the outer peripheral surface of the spool guide, is formed toward the rebound chamber with respect to the piston to connect the guide hole and the rebound chamber and is opened when the spool is moved to an opening position, and
a fourth passage, which is formed on each of the first tapered portions, is formed at the position of the branch groove toward the rebound chamber with respect to the third passage to connect the guide hole and the connection channel and is opened when the spool is moved to the opening position.

8. The damping force controlling shock absorber according to claim 1, wherein
after the fluid is moved along the main channel and the connection channel during the stroke, the main passage is formed toward the compression or the rebound chamber by the opening of the pilot valve,
after the fluid is moved along the main channel and the connection channel during the stroke, the pilot passage is formed toward the compression or the rebound chamber by the opening of the pilot valve, and
after the fluid is moved along the main channel and the connection channel during the stroke, the bypass passage is formed toward the compression or the rebound chamber by the opening of the pilot valve.

* * * * *